United States Patent Office 3,205,424
Patented Sept. 7, 1965

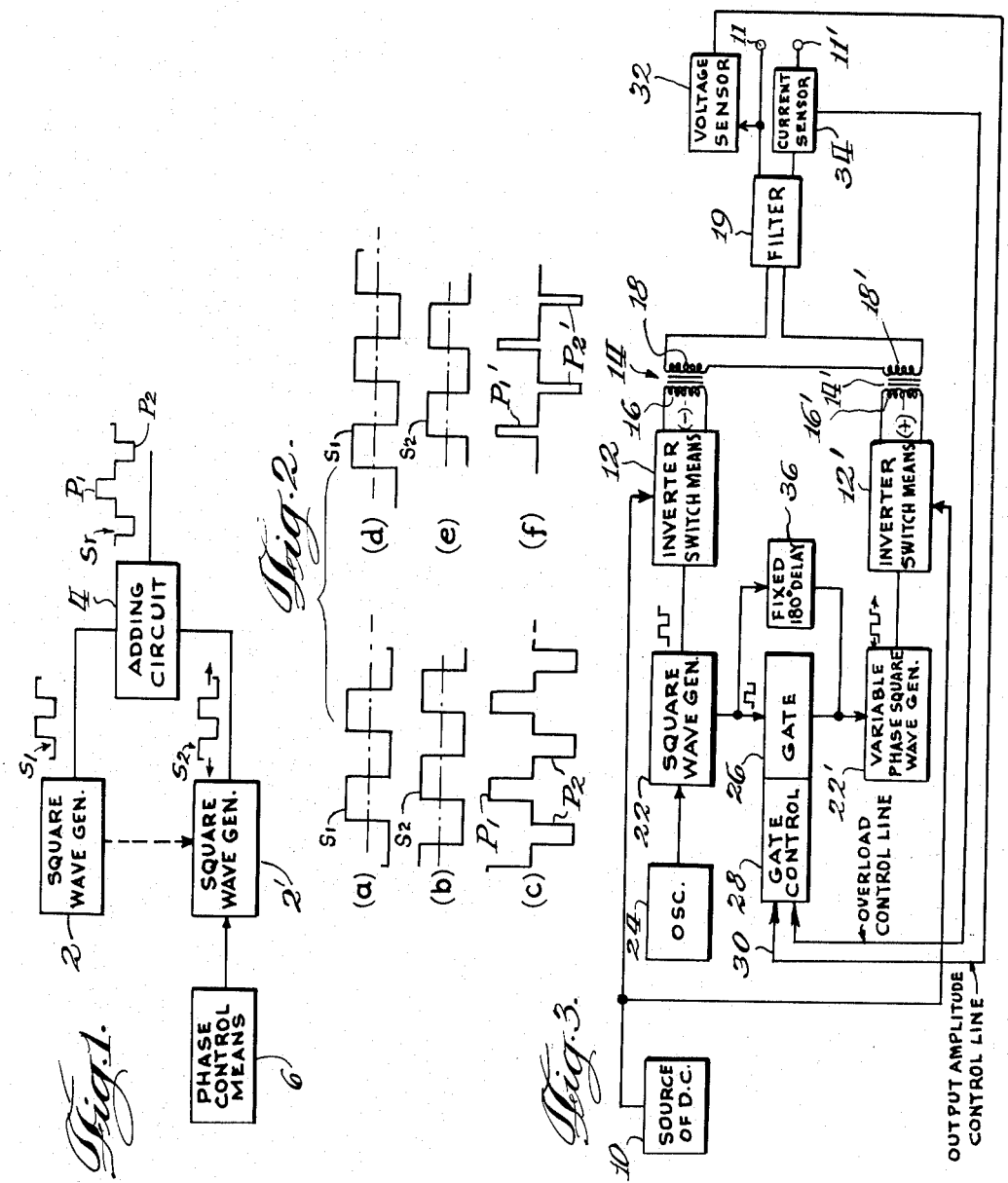

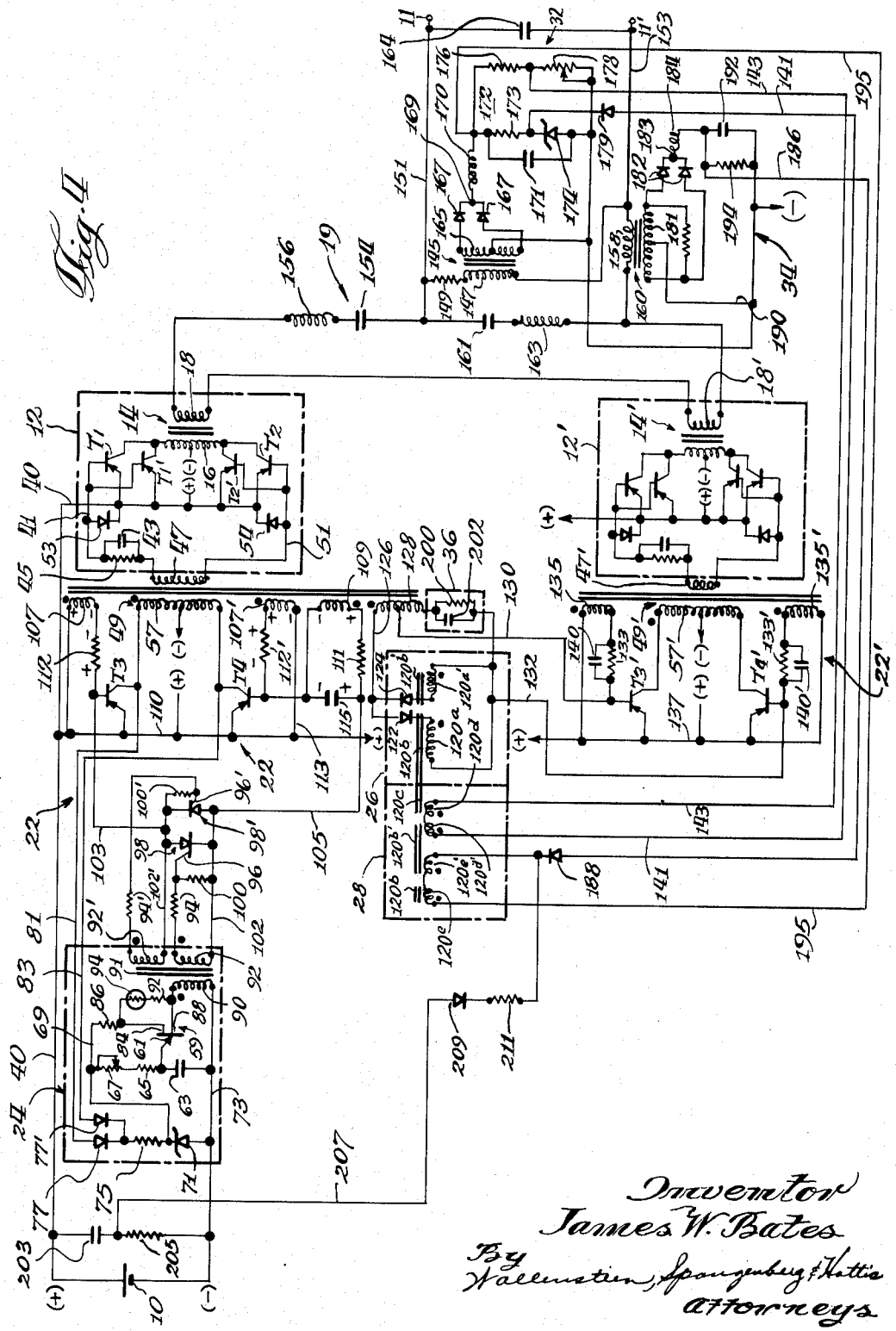

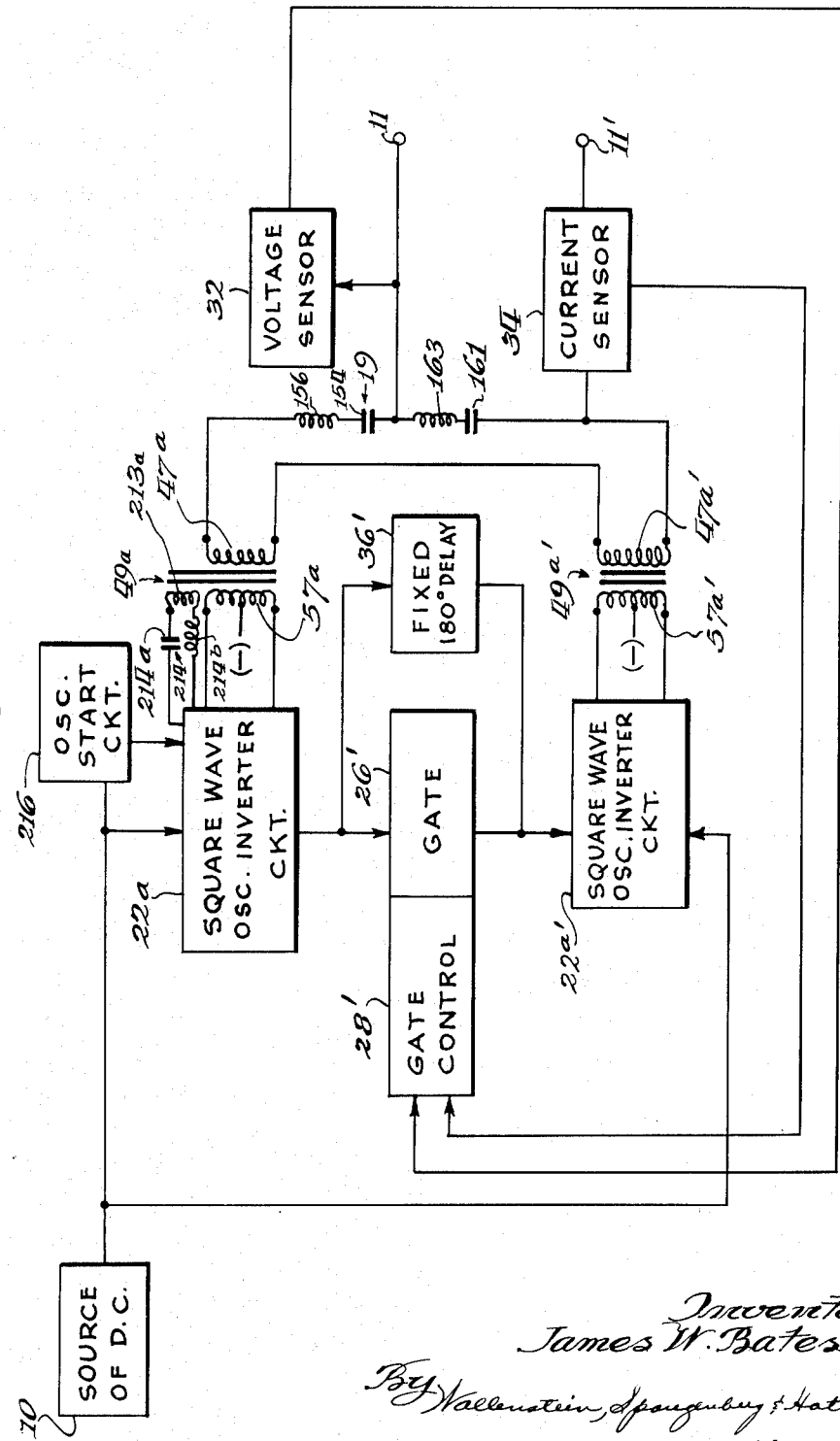

3,205,424
VOLTAGE PHASE CONTROLLER EMPLOYING SYNCHRONIZED SQUARE WAVE GENERATORS
James W. Bates, Palos Verdes, Calif., assignor to Gulton Industries, Inc., Metuchen, N.J., a corporation of New Jersey
Filed May 23, 1961, Ser. No. 111,939
6 Claims. (Cl. 321—18)

This invention relates to voltage phase controllers, and has one of its most important applications in pulse width controllers used in regulating the amplitude of a direct current or alternating current power supply voltage source.

Pulse width modulation is a well known form of modulation in telemetering and communication systems where the variation in pulse width represents information to be transmitted to a remote location. There is an application, however, of pulse width modulation in voltage regulator circuits. For example, a regulated direct current voltage can be obtained by feeding an output responsive, variable width, pulse train of a given polarity to a filter circuit which provides a direct current output proportional to the average amplitude of the pulse width modulated pulse train. By varying the width of the pulses, the average value of the direct current output voltage can be controlled. This method of voltage regulation is relatively efficient since there is no appreciable power dissipated in resistors or other dissipation elements, as in the case of other methods of voltage regulation heretofore practiced.

In pulse width modulation systems, the width of the pulses may be controlled by varying the conductive time of an electronic switch. This method of pulse width modulation is satisfactory for most low power applications. However, it has serious disadvantages in high power circuits where the switches are used to provide narrow high energy pulses by rendering the switches conductive for short intervals of time. Especially high power dissipation and low efficiency is present in such case. Where pulse width modulation is used in regulated direct and alternating current power supplies, the attendant power losses in a system as just described can be quite serious in applications where only a limited electrical energy source is available, such as a battery source in a satellite telemetering system and the like.

It is, accordingly, one of the objects of the present invention to provide a pulse width controller or modulator useful in providing variable width pulses of high energy content as, for example, would be the case where pulse width modulation is used to provide regulated voltages in power supplies and the like. A related object of the present invention is to provide a direct current operated A.C. or D.C. power supply source where pulse width modulation is used to regulate the amplitude of the voltage output with maximum efficiency and component reliability. A still further related object of the invention is to provide a regulated A.C. or D.C. power supply source as just described wherein the widths of the pulses can be varied readily over wide limits by electronic switches which are periodically opened and closed at a rate independent of the pulse widths desired at any instant, so that problems involved in closing the electronic switches for short intervals of time in relatively high current circuits are alleviated.

In the present invention, pulse width modulation is obtained by varying the relative phases of a pair of square wave signals having the necessary power requirements and each comprising positive and negative going portions of equal duration. These signals are added together to provide a resultant output of the two signals which comprises alternate positive and negative square pulses of a width depending upon the relative phases of the square wave signals which were added together. Where a direct current voltage is desired, rectifiers may be utilized to provide full or half wave rectification of the resultant signal waveform. Regulation is obtained by providing a means for varying the relative phases of the square wave signals which means is responsive to the output voltage conditions of the circuit.

Where the circuit is to be used as a regulated direct current to alternating current power supply, a filter network is provided which filters out most of the harmonics from the resultant pulse width modulated waveform, leaving primarily only the fundamental thereof. The amplitude of the fundamental frequency component is a function of the width of the pulses referred to. For this application, the phase controlled signals which are added together may be sine wave rather than square wave signals, which would alleviate the necessity for filters since the amplitude of the resultant sine wave output is a direct function of the relative phases of the added sine wave signals.

The aforementioned square wave signals are most advantageously obtained by a pair of inverter circuits each including an inverter transformer having a center tapped primary winding whose opposite ends are connected through high current capacity electronic switches, such as power transistors, to one of the terminals of a source of direct current, such as a battery supply. Each such inverter circuit further includes connection between the other terminal of the source of direct current and the center tap of the primary winding. The switches in each inverter circuit are alternately opened and closed at a fixed switching rate by means of control signals fed to the control terminals of the electronic switches which signals alternately open and close the switches for the same period constituting 180° of the desired square wave output. The control signals for each inverter circuit can constitute externally generated square wave signals or, in the most preferred form of the invention, internally generated fixed frequency signals obtained by converting the elements of the inverter circuit into a unique square wave multivibrator generator circuit. This circuit includes a shock excited resonant circuit for fixing the duration of each half cycle of the square wave signal to be generated.

The various features of the invention to be described relate to the manner in which the relative phase of the circuits for generating the square wave signals is controlled. In one form of the invention, the phase of the output of one of the square wave generators is controlled through a magnetic amplifier driven from the other square wave generator. The latter square wave generator, in turn, is synchronized in a manner involving other aspects of the present invention.

Still further features of the invention relate to means for preventing overload conditions in the circuit and in the circuit details of the square wave generators.

The aforesaid and other objects, features and advantages of the invention will become apparent upon making reference to the specification to follow, the claims and the drawings wherein:

FIG. 1 is a simplified box diagram of the method of pulse width modulation used in the present invention;

FIG. 2 shows square wave forms (*a*) and (*b*) of a given relative phase which when added together produce waveform (*c*), and square waveform (*d*) and (*e*) of a different relative phase which when added together produce waveform (*f*);

FIG. 3 is a box diagram of one form of a regulated direct current to alternating current converter using the features of the present invention;

FIG. 4 is a circuit diagram of an exemplary form of the invention shown in FIG. 3;

FIG. 5 is a box diagram of another and generally preferred form of the present invention.

Figure 6:
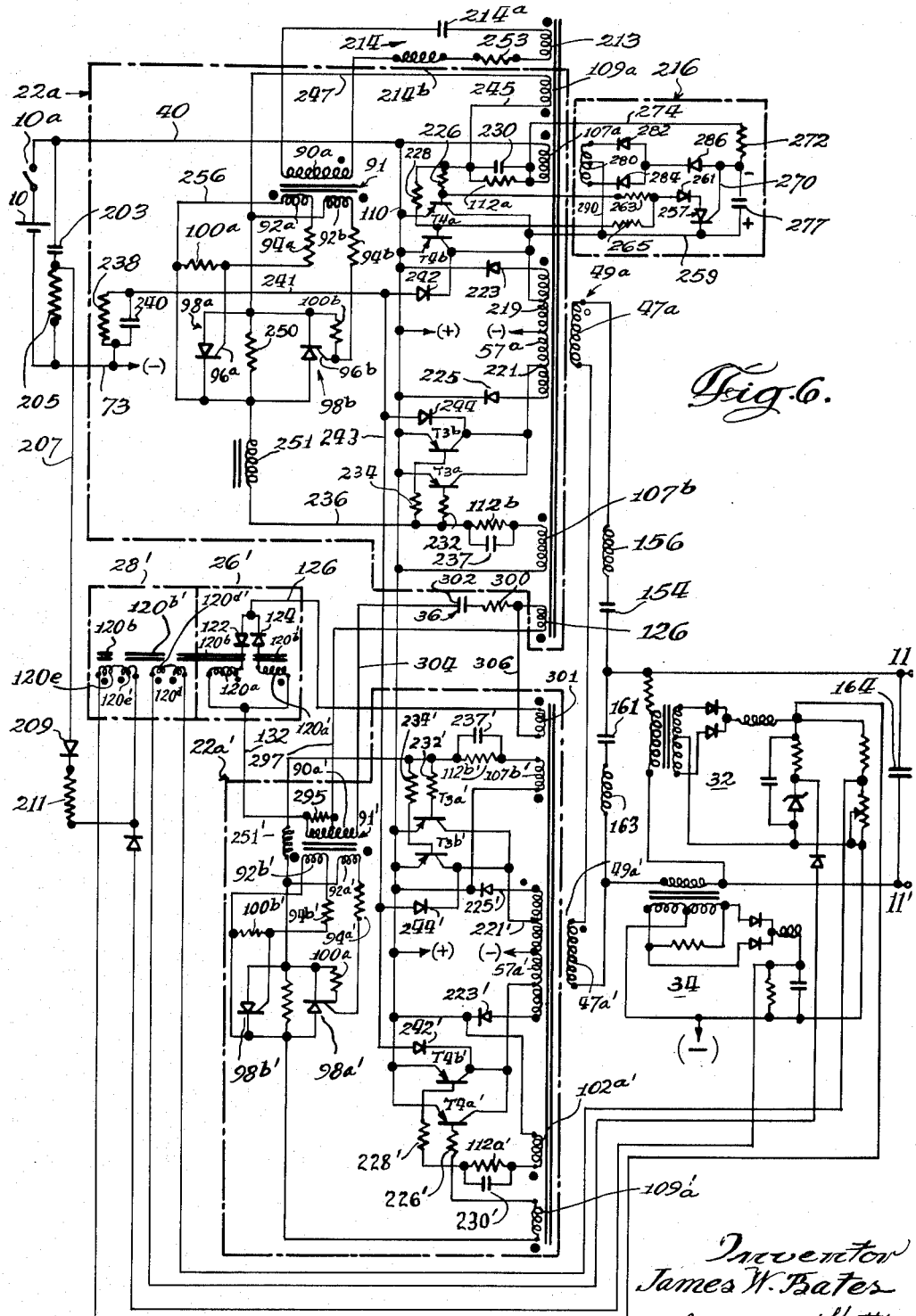
FIG. 6 is a circuit diagram of the form of the invention shown in FIG. 5.

Referring now more particularly to FIG. 1, a pulse width modulation circuit is illustrated therein comprising a square wave generator circuit generally indicated by reference numeral 2 which generates an alternating square wave signal S1 fed to an adding circuit 4. Another square wave generator circuit 2' is shown which is synchronized to provide an alternating square wave signal S2 of the identical frequency as the output square wave generator circuit 2 but variable in phase with respect thereto. The alternating square wave output of the square wave generator circuit 2' is also fed to the adding circuit 4 which adds the signal to the signal from the square wave generator circuit 2 to provide a resultant signal Sr comprising successive pulses P1 and P2 of the same amplitude and duration but of opposite polarity during each cycle of the added signals. The width of the pulses P1–P2 is determined by the relative phase displacement of the alternating square wave signals S1 and S2 fed to the adding circuit 4 as determined by a phase control means 6 which controls the phase of the square wave generator circuit 2'. This is illustrated by the two groups of waveforms (a)–(b)–(c) and (c)–(d)–(e) in FIG. 2.

Waveform (a) of FIG. 2 represents the output of square wave generator circuit 2 and waveform (b) represents the output of the variable phase square wave generator circuit 2' for a 90° phase displacement condition. The horizontal dashed lines shown on these waveforms represent the zero voltage points thereof. Each half cycle of these waveforms are exactly 180° (one-half cycle) long. In such case, by simple amplitude addition, the alternating waveform (c) is obtained wherein the alternating pulses P1–P2 each have a pulse width of 90°.

Waveforms (d) and (e) in FIG. 2 respectively represent the outputs of the square wave generator circuits 2 and 2' when the waveforms are almost but not quite 180° out of phase. By adding the amplitudes of these two waveforms, the narrow pulse waveform (f) is obtained. In any case the result of the square wave addition produces alternating pulses P1'–P2' having pulse widths equal to the deviation of the two waveforms from a 180° phase displacement condition. Thus, if waveform (e) is displaced 160° in phase from waveform (d), the addition waveform (f) comprises positive and negative pulses having a pulse width of 20° (180°–160°).

In one application of the invention, the pulse width modulation system just described is used to provide a regulated alternating current output. It can be shown that the resultant waveforms (c) and (f) in FIG. 2 can be broken down into a Fourier series of different frequency components, the fundamental of which has the frequency of the square wave signals which are added together to form the same and the amplitude of which is a function of the width of the pulses P1–P2 or P1'–P2'.

Refer now to the box diagram of FIG. 3 which makes use of the pulse modulation method illustrated in FIGS. 1 and 2 to provide a fixed amplitude sine wave output at output terminals 11–11' using as a primary power supply source a battery 10 or other source of direct current potential. FIG. 3 thus illustrates a regulated direct current to alternating current converter. As will appear from the detailed description to follow, this circuit includes a pair of inverter switching circuits 12–12' having output transformers 14 and 14' with center tapped primary windings 16–16' and secondary windings 18–18'. Each of the inverter switching circuits includes a pair of high current capacity switching elements, such as transistors to be described, which are alternately rendered conductive and non-conductive for equal time intervals, to couple the source of direct current voltage 10 in opposite directions through the halves of the primary winding 16 or 16' to induce square wave voltages and currents in the associated secondary winding 18 or 18'. The secondary winding 18 and 18' are connected in series additive relation to provide a resultant output representing the addition of the square wave signals induced into these windings. The converter circuit includes a filter circuit 19 which filters out most of the harmonics from the square wave additional signal, leaving primarily only the fundamental component thereof. Where a regulated D.C. output is desired, the filter 19 is replaced by a full wave rectifier (not shown).

The switching elements of the inverter switching circuits 12 and 12' are operated at the same frequency but with different relative timing to provide square wave signals of the same frequency but different phase. The phasing of the inverter switching circuits 12 and 12' is dependent upon the resultant output of the converter circuit. The timing of operation of the inverter switching circuits may also be controlled in such a way that an overload current condition will automatically adjust the relative phase of the square wave signals which are added together toward a 180° condition, where the resultant output is reduced.

Although the inverter switching circuits 12 and 12' may themselves constitute square wave multivibrator circuits in the manner of the preferred form of the invention to be described, in the form of the invention illustrated in FIG. 3 separate square wave generator circuits 22 and 22' are utilized which drive the switching elements of the inverter switching circuits alternately between their conductive and non-conductive conditions. The square wave generator circuit 22 is a master square wave generator circuit which, in a manner to be described, synchronizes the frequency of operation of the other square wave generator circuit 22' by means which permits a variation in the phase thereof. The square wave generator circuit 22 is preferably synchronized from an oscillator 24 which operates at a fixed predetermined frequency. The oscillator 24 operates at twice the frequency of the output of the square wave generators 22 and 22' so that each cycle thereof initiates the beginning of a new half cycle of the square wave generator output, thereby ensuring substantially identical time durations for successful half cycles of the square wave generator output.

The means for synchronizing the frequency of the output of the square wave generator 22' from the output of the square wave generator 22 while permitting variation in the phase thereof includes a gate circuit 26 whose input includes a signal from the square wave generator circuit 22. The gate circuit 26 is normally closed, the instant of opening of the gate being controlled by a gate control means 28. The gate control means 28 is connected by a line 30 to a voltage sensor circuit 32 which senses the output voltage of the converter circuit. The voltage sensor circuit 32 generates an error voltage upon the control line 30 which is a function of the difference between the amplitude of a reference potential and the instantaneous output of the converter circuit. This error signal controls the time at which the gate control means 28 opens the gate circuit 26. The opening of the gate circuit 26 passes a synchronized signal from the square wave generator circuit 22 to the square wave generator circuit 22' initiating the generation of a half cycle of a square wave signal. The gate control means 28 is operative each half cycle of the output of the square wave generator 22 so that the gate circuit 26 is opened every half cycle at the proper time to operate the square wave generator circuit 22' in the proper phase to stabilize the output voltage of the converter circuit.

A current sensor circuit 34 is provided in an output line of the converter circuit which, upon an overload current condition, operates the gate control means 28 to vary the instant of opening of the gate means to vary the phase of operation of the square wave generator circuit in a direction which reduces the amplitude of the converter output voltage. For short or very heavy circuit overloads, the phase of operation of the square wave generator circuit 22' is under control of a circuit 36 which automatically operates the square wave generator circuit 22' to produce an output which is 180° out of phase with the output of the square wave generator circuit 22.

Refer now to the circuit diagram of FIG. 4 which shows an exemplary circuit for carrying out the form of the invention shown in FIG. 3. The inverter switching circuit 12 is shown as comprising a first pair of parallel connected PNP power transistors T1–T1' and a second pair of parallel connected power transistors T2–T2'. The emitter electrodes of all of these transistors are connected by a bus 40 to the positive terminal of the source of direct current voltage 10, which is shown as a battery. The collector electrodes of the transistors T1–T1' are connected to the upper end of the primary winding 16 of the transformer 14 and the collector electrodes of the transistors T2–T2' are connected to the bottom end of the primary winding 16. The center tap of the primary winding is connected to the negative terminal of the battery 10. It is apparent that when the transistors T1–T1' are conducting, current flows in one direction through the primary winding 16 to the center tap point thereof, and when the other transistors T2–T2' are conducting current flows in the opposite direction through the primary winding 16. The two pairs of parallel connected transistors are rendered alternately conductive by control circuits associated with the base electrodes of the aforementioned transistors. To this end, the base electrodes of the transistors T1–T1' are connected by a conductor 41 through a capacitor 43 in parallel with a resistor 45 to the upper end of a secondary winding 47 of a drive transformer 49. The bottom end of the transformer 47 is connected by a conductor 51 to the base electrodes of the transistors T2–T2'. A diode 53 is connected between the base and emitter electrodes of the transistors T1–T1', the anode of the diode being connected to the base electrodes of the latter transistors and the cathode thereof being connected to the emitter electrodes of the latter transistors. A diode 54 is similarly connected between the base and emitter electrodes of the transistors T2–T2'. When the voltage of the upper end of the secondary winding 47 of the transformer 49 is negative with respect to the bottom end thereof, the upper transistors T1–T1' are rendered conductive and the bottom transistors T2–T2' are rendered non-conductive. When the polarity of the potential induced in the secondary winding 47 is reversed, the bottom transistors T2–T2' are rendered conductive and the upper transistors T1–T1' are rendered non-conductive.

The bottom inverter switching circuit 12' associated with the transformer 14' is identical to the circuit 12 just described so a detailed explanation thereof is unnecessary. It is sufficient to say that the operation of the inverter switching circuit 12' is controlled by a driver transformer 49' having an outlet winding 47' into which is induced an alternating voltage, preferably a square wave voltage, for alternately driving the two pairs of power transistors forming part of the circuit 12' in the manner described in connection with the circuit 12.

The transformers 49 and 49', as are the other transformers 14 and 14', are wound on magnetic core material having a rectangular hysteresis characteristic. The transformers 49 and 49' have center tapped primary windings 57 and 57' forming part of synchronized inverter circuits, constituting respective square wave generator circuits 22 and 22' to be described. The upper square wave generator circuit 22, as explained in connection with the box diagram of FIG. 1, is synchronized by an oscillator 24.

In FIG. 4, the oscillator 24 is shown as including a double-based diode 59. The emitter electrode 61 of the double-based diode 59 is connected to the juncture of a capacitor 63 and a resistor 65. The resistor 65 is connected to a variable resistor 67 connected to a conductor 69. The conductor 69 extends to a voltage stabilized circuit including a Zener diode 71 whose anode electrode is connected to a negative voltage bus 73 leading to the negative terminal of the battery supply 10 and whose cathode electrode is connected through a resistor 75 to the cathode electrodes of a pair of diodes 77–77'. The anode of one of the diodes 77 is connected by a conductor 81 to the upper end of the center tapped primary winding 57 of the driver transformer 49, and the anode of the other diode 77' is connected by a conductor 83 to the bottom end of the center tapped primary winding 49. As long as the transformer 49 is not saturated, a potential is developed in the primary winding 57 in the inverter circuit to be described which is coupled through the diodes 77 or 77' to the Zener diode circuit to provide a fixed direct current potential for driving the oscillator circuit.

The upper base 84 of the double-based diode is connected through a resistor 86 to the aforementioned conductor 69 leading to the Zener diode circuit. The bottom base 88 of the double-based diode is connected through the primary winding 90 of a transformer 91 to the negative bus 73. For temperature compensation purposes, a resistor 92 and a thermistor 94 are connected in series between the upper and lower bases of the double-based diode 59. As long as the Zener diode circuit is receiving potential from the primary winding of the transformer 49, the resultant direct current voltage developed in this circuit is effective to charge the capacitor 63. When the capacitor 63 reaches the firing potential of the double-based diode, the capacitor 63 discharges through the emitter and base electrodes of the double-based diode to provide a pulse of current in the primary winding 90 of the transformer 91. The gated diode then becomes relatively non-conductive again and the capacitor repeats the cycle just described. A voltage pulse of a fixed predetermined frequency appears in secondary windings 92 and 92' of the transformer 91.

The corresponding ends of the secondary windings 92 and 92' of the transformer 91 are connected through respective resistors 94 and 94' to the control electrodes of a pair of gated diodes 98 and 98'. As will appear, the firing of the gated diode 98 or 98' will be effective to initiate the beginning of a half cycle of a square wave signal generated by the square wave signal generator circuit 22. The control circuit of the gated diode 98 includes a resistor 100 connected between the control electrode of the latter gated diode and a conductor 102 leading to the bottom end of the secondary winding 92. The control circuit of the gated diode 98' has a corresponding resistor 100' connected between its control electrode and the conductor 102' leading to the bottom end of the secondary winding 92'.

The cathode electrode of the gated diode 98 is connected to the aforementioned conductor 102 and the cathode electrode of the gated diode 98' is connected to the corresponding conductor 102'. The anode electrode of the gated diode 98 is connected to the conductor 102' and the anode electrode of the gated diode 98' is connected to the conductor 102. The anode and cathode electrodes of the gated diodes 98 and 98' are effectively connected in opposed parallel relationship so that only one of the gated diodes is rendered conductive at any instant to close the circuit between a pair of conductors 103 and 105 forming part of a feedback circuit for a transistor oscillator circuit including the aforementioned transformer 49.

The transformer 49 has an upper feedback winding 107, a bottom feedback winding 107', and another bottom feedback winding 109. Dots are shown in FIG. 4 opposite those ends of the various windings of the transformer which have the same polarity at any given instant. As will appear, the feedback winding 109 is coupled between the base electrodes of a pair of PNP transistors T3 and T4 when one of the gated diodes 98 or 98′ is fired. The connections between the gated diodes, and the feedback windings 107, 107′ and 109 are such that a loop circuit is formed where these windings are always in phase additive relationship where they are effective to prepare one of the gated diodes for conduction and to render the other gated diode non-conductive. Also, upon initial conduction of one of the gated diodes the voltages induced in the feedback winding 109 and the respective windings 107 or 107′ are in series additive relation in opposite sense with respect to the base to emitter circuits of the respective transistors T3 and T4 and are operative to render conductive the transistor which is then non-conductive and to render non-conductive the transistor which is then conductive.

The loop circuit referred to can be traced from a common conductor 110 to the dotted end of the feedback winding 107, through a resistor 112 connected to the base electrode of the upper transistor T3, the conductor 103, gated diode 98 or 98′, conductor 105, a resistor 111, the dotted end of the feedback winding 109, a resistor 112′, the dotted end of the feedback winding 107′ and a return conductor 113 connected to the common conductor 110 leading to the positive bus 40. The square wave generator circuit is completed by connection of the collector electrodes of transistors T3 and T4 to the opposite ends of the center-tapped primary winding 57 and the emitter electrodes thereof to the common conductor 110.

The operation of the square wave generator circuit may be explained as follows. When power is initially turned on, one of the transistors T3 or T4 will start conducting first. Whichever transistor this may be, the resulting flow of current through the associated half of the primary winding 57 will induce a voltage in the feedback windings 107 and 107′ which, it will be noted, are connected in opposite sence between the base and emitter electrodes of the associated transistors so that the voltages induced therein will be in a direction to sustain the conduction of the first to conduct transistor and to render the other transistor non-conductive. In the absence of the portion of the circuit including the gated diodes 98 and 98′, the circuit just described would act a free running square wave multivator circuit at a frequency which is preferably lower than one-half the frequency of the synchronizing oscillator 24. In this way, the oscillator 24 will determine the frequency of operation of the square wave generator circuit rather than the natural free running frequency of the square wave generator circuit. Normally, the pulses from the synchronizing oscillator 24 will be effective to switch the conductive states of the transistors before the associated transformer has become fully saturated. When an oscillator pulse appears in transformer secondary windings 92 and 92′, the gated diode which is prepared to fire by the additive voltages in the feedback windings of the loop circuit referred to above will fire. The voltage then induced in the feedback winding 109 will add to the voltages induced in the feedback winding 107′ to change the conductive state of the transistor T3 and will add to the voltage induced in the feedback winding 107 to change the conductive state of the transistor T4. When the conductive states of the transistors T3 and T4 have thus become reversed from their previous conditions, the polarity of the voltages then induced in the feedback windings 107, 107′ and 109 will reverse also. Normally this would result in the blocking of the then conductive gated diode and the preparation of the other gated diode for firing by the next synchronizing oscillator pulse.

If the current synchronizing oscillator pulse has not subsided by the time the conductive states of the transistors have been switched and the gated diode rendered non-conductive, this pulse can retrigger the circuit, which would obviously be undesirable since it is the next trigger pulse and not the trigger pulse referred to that is to trigger the next half cycle of operation of the square wave generator circuit. To prevent this occurence, a capacitor 115 is connected between the upper end of the feedback winding 109 and the end of the resistor remote from the bottom end of the feedback winding 109. The capacitor 115 sustains the conduction of the fire gated diode for awhile to insure the decay of the synchronizing oscillator pulse before the gated diode involved is rendered non-conductive.

It is possible that the initial timing conditions in the circuit are such that the core of transformer 49 will saturate before the first pulse is generated by the synchronizing oscillator 24. In such case, the saturation of the core will result in a reversal of the conduction of the transistors T3 and T4. The subsequent pulses generated by the oscillator may thereafter occur at points in the operating cycle of the square wave generator circuit which permit the core to be triggered alternately by the saturation of the core and by the synchronizing pulses which will cause the square wave oscillator circuit to operate at twice the desired frequency, which, of course, is undesirable. The result is prevented by designing the oscillator circuit 24 so that the normal operation thereof is disrupted if the transformer 49 should saturate. To this end, the energization circuit of the synchronizing oscillator 24 is designed as previously described where the energizing voltage therefor is obtained from the voltage developed in the primary winding 57 of the transformer 49. As previously explained, the energization voltage for this circuit disappears when the transformer 49 saturates, which results in the discharge of the timing capacitor 63, thereby disrupting the normal timing cycle of the synchronizing oscillator 24.

As indicated in the box diagram of FIG. 3 previously described, the output of the square wave generator circuit 22 is utilized to synchronize the other square wave generator circuit 22′ in a manner which permits variation in the phase but not the frequency of operation of the square wave generator 22′. The circuit for accomplishing this includes the aforementioned gate circuit 26 and gate control means 28. The preferred form for the gate circuit and gate control means is shown in the circuit diagram of FIG. 4 where they are shown as portions of two saturable core devices diagramatically shown, the parts of the two devices to be described being identified by reference manual 120 followed by an alphabet character. The parts of the two devices can be distinguished by a (′) used adjacent the reference characters of one of the devices. The gate portion thereof comprises windings 120a and 120a′ wound around respective saturable cores 120b and 120b′. The winding 120a is connected in series with a rectifier 122 and the winding 120a′ is connected in series with a rectifier 124. The two series circuits comprising the windings 120a and 120a′ and their associated rectifiers 122 and 124 are connected in parallel, with the rectifiers oppositely connected in the branch circuits involved. Current flow in the low impedance direction of these rectifiers generate magnetomotive forces in the cores 120b and 120b′. It is apparent that only one of the branch circuits will be conductive at any one time because of the opposite connections of the rectifiers. One end of this parallel circuit is connected by a conductor 126 to the upper end of an output winding 128 on the transformer 49 of the square wave generator circuit 22. The winding 128 has a center tap which is connected by a conductor 130 to the base electrode of a PNP transistor T3′ forming part of the square wave generator circuit 22′. The other end of the parallel circuit referred to is connected by a conductor 132 to the base electrode of a PNP transistor T4′ in the square wave generator circuit 22′.

The transistors T3′ and T4′ are located in a circuit similar to the circuit in which the transistors T3 and T4 form part of the square wave generator circuit 22. Thus, the base electrode of the transistor T3′ is connected through a resistor 133 and through a feedback winding 135 on the aforementioned transformer 49'. The feedback winding 135 is connected to a common conductor 137 connected to the emitter electrodes of the transistors T3' and T4' which, in turn, extends to the positive bus 40 leading to the positive terminal of the battery supply 10. The base electrode of the transistor T4' is connected through a resistor 133' to a feedback winding 135' of transformer 49' which is connected to the common conductor 137. Capacitors 140–140' are connected across the resistors 133–133' to increase the speed of response of the square wave generator circuit 22'. The collector electrodes of the transistors T3' and T4' are connected to opposite ends of the center tapped primary windings 57' of the transformer 49'. The circuit just described including the transistors T3' and T4' form a multivibrator circuit which, in the absence of synchronizing pulses, would operate at a free running frequency somewhat lower than the frequency at which it is to be synchronized. The feedback windings 135 and 135' operate in the same manner as the feedback winding 107–107' in the square wave generator circuit 22.

The manner in which the square wave generator circuit 22' is synchronized may be explained as follows. The voltage induced in the output winding 128 of the transformer 49 is a square wave signal in phase with the square wave output of the square wave generator circuit 22. The polarity of the voltage present between the upper end and the center tap point of the output winding 128 reverses each half cycle. Accordingly, either the rectifier 122 or 124 couples the output of the transformer winding 128 each half cycle to the associated winding 120a or 120a'. This voltage is coupled through the winding 120a or 120a' provided the associated core is saturated. Otherwise, the impedance of the winding 120a or 120a' acts as a closed gate circuit which prevents the coupling of the output of the transformer 128 to the square wave generator circuit 22'. When the core device 120 saturates, the voltage coupled by the rectifier 122 or 124 to the control circuits of the transistors T3' and T4' is of a polarity to render the conductive transistor non-conductive and the non-conductive transistor conductive, to initiate a new half cycle of operation of the square wave generator circuit 22'. Each half cycle of operation of the square wave generator circuit 22' is thus synchronized by a signal coupled thereto from the output winding 128 when the saturable cores 120b and 120b' become saturated. In a manner to be described, the cores 120b and 120b' are reset when the voltage condition in transformer 128 is reversed from that which caused the initial saturation thereof.

The resetting of the cores 120b and 120b' and the timing of the saturation of the cores are controlled by series connected windings 120d and 120d' respectively wound on cores 120b and 120b'. In a manner to be described, a direct current back biasing current flows in the control windings 120d and 120d' in accordance with the output conditions of the inverter circuit. The cores 120b and 120b' become saturated during successive half cycles and at variable times therein depending upon the value of the magnetomotive forces created by the back biasing currents in the windings 120d and 120d'. The windings 120d and 120d' are connected in series and the unconnected ends thereof are connected by conductors 141 and 143 to the output of the voltage sensor circuit generally indicated by reference numeral 32 in the output of the converter circuit. The magnetomotive forces generated by the current flowing in the windings 120d and 120d' oppose the magnetomotive force generated in these cores by the current flowing in the windings 120a and 120a' in the low impedance direction of the rectifiers 122 and 124, and reset the associated cores during the half cycles when no appreciable current is flowing in the windings 120a and 120a'.

The voltage sensor circuit includes a coupling transformer 145 having a primary winding 147 whose upper end is connected through a resistor 149 to a power output line 151 leading to the output terminal 11. The other end of the winding 147 is connected to a power output conductor 153 extending to the output terminal 11'. The conductor 151 is connected to a capacitor 154 and coil 156 forming part of the filter circuit 19. The capacitor and coil form a series resonant circuit at the fundamental frequency of the aforesaid square wave signals which is the same as the frequency of the resultant signal produced by the addition of these signals. The coil 156 is shown connected to the upper end of the secondary windings 18 of the transformer 14 of the inverter switching circuit 12. The conductor 153 is connected to the primary winding 158 of a current transformer 160 and the winding 158, in turn, is connected to the bottom end of the secondary winding 18' of the transformer 14' of inverter switching circuit 12'. A capacitor 161 and a coil 163 forming a series circuit resonant at the third harmonic of the resultant or addition signal produced by the converter circuit is connected between the bottom end of the winding 18' and the conductor 151. It is thus apparent that the voltage appearing across the primary winding 147 of the transformer 145 is at most only a moderately distorted sine wave signal at the fundamental frequency referred to above. This same signal, of course, appears across the output lines 151 and 153. A filter capacitor 164 is connected across output terminals 11–11' to filter out most of the higher harmonic components which were not previously filtered out.

The transformer 145 has a center tapped secondary winding 165 forming part of a full wave rectifier circuit. To this end, the opposite ends of the latter winding are connected through rectifiers 167—167 to a common point 169. A filter choke 170 is connected between the point 169 and one end of a bridge circuit generally indicated by reference numeral 172. The center tap of the winding 165 is connected to the other end of the bridge circuit 172. A filter capacitor 171 is connected across the ends of the bridge circuit 172. The bridge circuit 172 comprises two branches, one of which includes a resistor 173 in series with a Zener diode 174 and the other of which comprises a resistor 176 and a variable resistor 178. The end of the bridge circuit 172 adjacent the Zener diode 174 is connected to the negative bus 73.

The Zener diode 174 is a device which, in the circuit described, fixes the potential across it. The juncture between the Zener diode and the resistor 173 is connected through a rectifier 179 arranged to pass a negative potential from the latter point to the conductor 141 leading to the left hand end of the control winding 120d of the saturable control device 120. The conductor 143 extending to the right hand end of the control winding 120d is connected to the juncture of resistors 176 and 178. The variable resistor 178 is adjusted to provide the proper voltage conditions at the output of the bridge circuit 172 to control the regulation point. As the output voltage conditions of the converter circuit tend to vary, the output of the bridge circuit 172 varies which, in turn, varies the current flowing in the winding 120d and the point in each half cycle at which the saturable core device 120 will saturate.

As previously indicated, the circuit now being described has a current sensor circuit 34 for automatically preventing a current overload condition. The current sensor circuit 34 shown in FIG. 4 includes the aforementioned current transformer 160. The current transformer has a center tapped secondary winding 181 which forms part of a full wave rectifier circuit. Thus, the opposite ends of the secondary winding 181 are connected through rectifiers 182 to a common point 183. A filter choke 184 is connected between the point 183 and a conductor 186. The conductor 186 connects through a rectifier 188 to the right hand end of a pair of series connected control windings 120e and 120e' wound on the saturable cores 120b and 120b'. The center tap point of the secondary winding 181 is connected by a conductor 190 to the negative voltage bus 73. A filter capacitor 192 in parallel with a resistor 194 is connected between the negative bus and the aforementioned conductor 186. It should thus be apparent that a positive direct current voltage is developed on the conductor 186 which is proportional to the value of the current flowing through the primary winding of the current transformer 160. This voltage is applied through the rectifier 188 to the right hand end of the winding 120e' of the saturable core 120b'. The left hand end of the winding 120e is connected by a conductor 195 to the positive output of the full wave rectifier circuit associated with the transformer 145. The positive potential appearing on the conductor 195 acts as a back bias for the rectifier 188 to prevent current flow through the winding 120e until the voltage developed by the current sensor circuit exceeds this back bias voltage. When this occurs a bias current flows through the windings 120e–120e' which produces magnetomotive forces in the respective cores 120b–120b' developed in the control windings 120d–120d' and, in effect, delay the saturation of the cores by the synchronizing voltage in the transformer windings 128, to reduce the amplitude of the converter output voltage.

For heavy overloads, the large current developed by the current sensor circuit is such that the synchronizing current cannot overcome the bias currents. In this event, a synchronizing signal for operating the square wave signal generator circuit 22' to produce a signal 180° out of phase with the output of square wave generator circuit 22 is provided by the circuit 36. This circuit 36 includes a resistor 200 in parallel with a capacitor 202 which is connected between the bottom end of the output winding 128 of the transformer 49 and the conductor 132 leading to the base electrode of the transistor T4'. The sudden reversals of the square wave voltage induced in the winding 128 are coupled through the capacitor 202 to the base electrode of the transistor T4' alternately to render this transistor conductive and non-conductive properly to synchronize the half cycles of operation of the square wave generator circuit 22' to produce the 180° out of phase signal.

Means are provided for preventing excess output voltage due to transient voltage conditions on the power conductors at the input to the converter circuit. To this end, a capacitor 203 and a resistor 205 are connected in series between the power conductors 40 and 73 so that any sudden change in voltage across these conductors is applied across the resistor 205. The resistor is connected by a conductor 207 through a rectifier 209 and resistor 211 to the right hand end of the control winding 120e' of the saturable core 120b'. The result of a sudden increase in a positive voltage on the power conductor 40 is to cause an increase current flow in the windings 120e–e' in a direction which will shift the phase of the output voltage of the square wave generator circuit 22' in a direction to bring this voltage toward the 180° phase relation with respect to the output of the other square wave generator circuit 22. As previously indicated, the sum of these two voltages in such case will produce a resultant output across the terminals 11 and 11' which is smaller than would otherwise be the case.

The exemplary embodiment of the invention shown in FIG. 4 is highly satisfactory, provided the frequency of the oscillator 24 does not vary much in frequency. Wide temperature fluctuations or aging of the double based diode 59 will change the frequency of the oscillator 24 and hence the frequency of the square wave generators 22 and 22'. Such a variation in frequency is undesirable from a number of standpoints. In the first place, it would obviously be undesirable in a situation where the equipment to be operated by the converter circuit requires a fixed frequency. In the second place, any appreciable frequency variation will adversely affect the voltage regulation of the converter circuit and will add distortion to the output signal, which is preferably a pure sine wave signal. The distortion and regulation problems are due to the fact that the resonant circuit elements making up the filter circuit 19 have a resonance characteristic which is completely independent of the frequency of the oscillator 24. A variation in the frequency of the oscillator 24 by even a few percent from the fundamental resonant frequency of the filter circuit 19 may result in a substantial increase in third harmonic distortion and variation in the peak and root means square value of the filtered output. It is, therefore, highly advantageous to keep the frequency determining element of the oscillator 24 to as close a tolerance as possible, without complicating the circuit. To this end, the embodiment of the invention shown in a simplified box diagram form in FIG. 5 was developed. This circuit not only has a better frequency and voltage regulation with age and widely varying temperature conditions, but it is a less complicated and more efficient circuit. The circuit of FIG. 5 has many components in common with the circuit of FIG. 3 and the components shown in FIG. 5 which correspond to components in FIG. 3 have been given similar reference numerals.

One of the improvements in the circuit of FIG. 5 is the utilization of resonant circuit components 214 which are similar to those used in the filter circuit 19, to provide a resonant circuit stabilized square wave generator circuit. These resonant circuit components include a capacitor 214a and an inductance coil 214b forming a resonant circuit tuned to the desired frequency of the inverter circuit and used in a unique way never before used in a square wave generator circuit. The use of the resonant circuit 214 has many advantages over the method of frequency control used in the embodiment of FIG. 3. In the first place, the capacitor and inductance circuit components are much less prone to vary with temperature and age than a double based diode or similar semiconductor device. Just as important, however, is the fact that any changes in the resonant frequency of the circuit 214a which do occur take place in the same direction and to a similar degree to changes of the resonant frequency of the capacitor and inductance components making up the filter circuit 19.

Still another improvement of the circuit shown in FIG. 5 is the provision of a single square wave oscillator and inverter circuit 22a which takes the place of the separate oscillator 24, square wave generator circuit 22 and inverter switching circuit 12 in FIG. 3. Also, a square wave oscillator and inverter circuit 22a' is provided which carries out the functions of the separate variable phase square wave generator circuit 22' and inverter switching circuit 12' in FIG. 3. This results in increased efficiency and reliability.

In the form of the invention shown in FIG. 5, the square wave oscillator and inverter circuits 22a and 22a' each may comprise a high current capacity inverter circuit similar in many respects to the lower current capacity square wave generator circuit 22 in FIG. 4. The circuit 22a and 22a' have output transformers 49a and 49a' with windings corresponding to those of the transformers 14 and 14' previously described in connection with the circuit of FIG. 4. An additional secondary winding 213a, however, is added to transformer 49a to which winding the capacitor 214a and inductance 214b are connected forming a shock excitable resonant circuit 214. The circuit 214 receives energy pulsations each time the current reverses in direction in the primary winding 57a of the transformer due to the reversal of the conductive states of the current control devices forming part of the circuit 22a. The square wave oscillator and inverter circuit 22a constitutes a free running multivibrator circuit which is synchronized by the shock excited signals in the resonant circuit 214.

To initiate the oscillation of the multivibrator circuit 22a, it was found desirable to add an oscillator start circuit 216 which feeds current in a given direction through the primary winding 57a of the transformer 49a to initiate feedback signals and the shock excitation of the resonant circuit 214. The square wave signal generated by the square wave oscillator and inverter circuit 22a is effective to trigger the square wave-oscillator and inverter circuit 22a' through the gate circuit 26' when the gate control means 28' opens the gate 26' in a manner similar to that previously described in connection with the circuit of FIG. 5.

Refer now to FIG. 6 which illustrates a preferred embodiment of the form of the invention shown in FIG. 5. As previously indicated, the square wave oscillator and inverter circuits 22a and 22a' in FIG. 6 have many features in common with the square wave generator circuit 22 shown in FIG. 4. The corresponding portions of these circuits have been given similar reference numerals. The circuit 22a is an inverter circuit connected directly in series between the source of direct current voltage 10 and the output portion of the converter circuit. It comprises respective pairs of parallel connected power transistors T3a–T3b and T4a–T4b. The emitter electrodes of all these transistors are connected to a common line 110 leading to the positive power bus 40. The collector electrodes of the transistors T4a and T4b are connected to a common tap point 219 at the upper portion of the primary winding 57a and the collector electrodes of the transistors T3a and T3b are connected to a common tap point 221 at the lower portion of the primary winding 57a. The primary winding 57a has a center tap leading to the negative power bus 73. The upper end of the primary winding 57a is connected by a reverse current bypass rectifier 223 to the positive line 110 and the bottom end of the primary winding 57a is connected though a reverse current bypass rectifier 225 to the latter line 110. The base electrodes of the transistors T4a and T4b are connected through respective resistors 226 and 228 to a common point, in turn, connected through a resistor 112a in parallel with a capacitor 230 to the bottom end of a feedback winding 107a of the transformer 49a. The other end of the transformer winding 107a is connected to the positive voltage bus 40.

In a like manner, the base electrodes of the transistors T3a and T3b are connected through respective resistors 232 and 234 to a common point in turn connected through a resistor 112b in parallel with a capacitor 237 to the upper end of feedback winding 107b. The other end of the winding 107b is connected to the line 110 leading to the positive bus 40.

A circuit for filtering spike voltages from the circuit is provided which includes a resistor 238 in parallel with a capacitor 240 connected to the negative voltage bus 73. A conductor 241 connects the resistor and capacitor through a rectifier 242 arranged to block negative pulses to the collector electrodes of the transistors T4a and T4b. The line 241 is also connected by a conductor 243 and through a rectifier 244 arranged to block negative pulses to the collector electrodes of the transistors T3a and T3b.

A feedback winding 109a is provided on the transformer 49a which winding has a bottom end connected by a conductor 245 to the juncture between resistors 226 and 112a. The upper end of the winding 109a is connected by a conductor 247 to one end of a parallel circuit comprising the anode and cathode or load terminals of a pair of gated diodes 96a and 96b which operate in a similar manner to gated diodes 96 and 98 in the embodiment of FIG. 4. A resistor 250 is connected in parallel with the cathode and anode electrodes of the gated diodes. The bottom end of the parallel circuit is connected through a saturable choke 251 to the aforementioned conductor 236 leading to the base electrode connecting resistors 232 and 234 associated with the transistors T3a and T3b. The saturable choke is designed to saturate prior to the core of transformer 49a and is operative to prevent reverse current flow through the synchronizing circuit until the currently fired diode is de-energized or rendered non-conductive.

The various connections described connecting the feedback windings 107a, 109a and 107b and the load terminals of the gated diodes 98a and 98b form a loop circuit where the voltages induced in the feedback windings are always in additive relationship. As in the previously described circuit 22 of FIG. 4, whenever one of the gated diodes 98a and 98b is fired, the conducting states of the transistor pairs T4a–T4b and T3a–T3b are reversed to initiate a new half cycle of the multivibrator circuit.

The circuit for triggering the gated diodes 98a and 98b includes the aforesaid resonant circuit 214 including capacitor 214a and inductance 214b forming a series resonant circuit which resonants at the desired frequency of operation of the multivibrator circuit which is somewhat higher than the free running frequency thereof. The capacitor 214a is shown connected to the upper end of the transformer winding 213 and the inductance 214b is connected through a resistor 253 to the bottom end of the transformer winding 213. This series resonant circuit is connected between the opposite ends of a primary winding 90a of a pulse transformer 91. The transformer 91 has secondary windings 92a and 92b associated with the control electrodes 96a and 96b of the gated diodes 98a and 98b, respectively. The right hand ends of the windings 92a and 92b are shown respectively connected through resistors 94a and 94b to the control electrodes 96a and 96b, respectively. The left hand end of the winding 92b is connected to the aforementioned conductor 247 leading to the upper end of the parallel connected cathode and anode electrodes of the gated diodes. The left hand end of the winding 92a is connected by a conductor 256 to the bottom end of the parallel circuit referred to. The connections made from the transformer windings 92a and 92b to the control electrodes of the gated diodes are such that the polarity of the pulses fed thereto are of opposite polarity at any given instant, and the gated diode receiving a positive pulsation control signal at any instant is the gated diode which has applied thereto by the aforesaid feedback windings a voltage of proper polarity to fire the gated diode involved.

The shock excitable resonant circuit 214 receives its energy from the voltage induced in the winding 213. The polarity of this excitation voltage will obviously change each time the multivibrator starts a new half cycle which, in turn, is initiated by the shock excited signals in the resonant circuit 214. As the sine wave voltage induced in the primary winding 90a of the transformer 91 changes direction, a pulse having a polarity dependent upon the direction of this change will be applied to the control electrodes 96a and 96b of the gated diodes. It is apparent that the multivibrator circuit is synchronized to operate at the frequency of the resonant circuit 214.

Due to the power requirements necessary to start the oscillator circuit into operation, a unique oscillator start circuit is provided for initially feeding current through the primary winding 57a of the output transformer 49a to generate induced voltages in the various feedback windings to start the oscillator or multivibrator circuit. This oscillator start circuit, generally indicated by reference numeral 216, includes as a basic control element thereof a gated diode 257. The cathode electrode of this gated diode is connected to a conductor 259 extending to the tap point 219 of the primary winding 57a of the output transformer 49a. The anode electrode of the gated diode 257 is connected to the cathode electrode of a rectifier 261 acting primarily as a voltage dropping element in a manner to be described. The anode of the rectifier 261 is connected through respective resistors 263 and 265 to the base electrodes of the transistors T4a and T4b. The control electrode of the gated diode 257 is connected through a conductor 270, a resistor 272 and a conductor 274 to the bottom end of the feedback winding 107a. Due to the connections just described, a circuit can be traced which, when the direct current voltage supply 10 is connected into the circuit by the closure of a power on-off switch 10a, effects firing of the gated diode 257 to start heavy conduction of the transistors T4a–T4b which feeds current in a given direction through the primary winding 57a to start the oscillation of the multivibrator circuit. This circuit can be traced from the power line 40 through the line 110, emitter and base electrodes of transistors T4a and T4b, resistors 263 and 265, rectifier 261, anode and cathode terminals of the gated diode 257, conductor 259, and the winding 57a connected to the negative power line 73. The voltage applied to the gated diode 257 by this circuit is in a direction to fire the same provided, of course, the control electrode thereof receives a positive triggering voltage. The circuit for applying the positive triggering voltage can be traced from the bottom end of the transformer winding 107a and through the conductor 274, resistor 272 and conductor 270 leading to the control electrode of the gated diode. The current flow established in the gated diode flows through the emitter and base electrodes of the transistors T4a–T4b which is amplified to provide a heavy emitter-collector current which flows in the primary winding. This amplified current initiates the oscillation of the multivibrator. The voltage drop across the rectifier 261 in series with the gated diode 257 drops the voltage applied to the anode and cathode electrodes of the gated diode to enable the gated diode to be rendered non-conductive more easily in a manner to be described, to increase the efficiency of the circuit.

The circuit for rendering the gated diode 257 non-conductive once the oscillator has started oscillating includes a capacitor 277 which is gradually charged once the multivibrator oscillator begins oscillating. The capacitor 277 is connected between the control and cathode electrodes of the gated diode 257. When the voltage at the upper end of the plate of the capacitor reaches a given negative value with respect to the bottom plate thereof, the voltage conditions of the circuit are such that a positive voltage cannot be established across the control electrode of the gated diode 257. The gated diode cannot then refire after the voltage conditions applied to the anode and cathode electrodes thereof are reduced to a value which will not support the conduction thereof, which condition exists during the second half cycle of operation of the multivibrator circuit. The circuit for charging the capacitor 277 to the negative voltage referred to includes a full wave rectifier circuit energized from an additional winding 280 on the transformer 49a. The opposite ends of this winding are connected through respective rectifiers 282 and 284 to a common rectifier 286, in turn, connected to the upper plate of the capacitor 277. The winding 280 has a center tap connected by a conductor 290 to the conductor 259 leading to the bottom end of the capacitor 277. It is apparent, therefore, that as soon as the oscillator starts oscillating, a negative voltage will be coupled through the full wave rectifier circuit just described to the capacitor 277 to charge the same to the negative voltage referred to. When this occurs, the oscillator starter circuit will be disabled and the circuit will operate at top efficiency.

The square wave oscillator and inverter circuit 22a' is a circuit substantially similar to the circuit 22a just described and the circuit components of the circuit 22a' have been numbered similarly to the corresponding components of the circuit 22a except that a prime has been added thereto. One of the differences between the circuits 22a and 22a' is that the circuit 22a' does not need to have any oscillator start circuits since it receives its starting and synchronizing potential from the circuit 22a. The square wave oscillator and inverter circuit 22a' has a synchronizing circuit including gated diodes 98a' and 98b' connected in a circuit almost identical to the gated diode circuit associated with the square wave oscillator inverter circuit 22a. The pulse transformer 91' of the circuit 22a', however, has a primary winding 90a' which receives a driving voltage from the gate circuit 26' which, as above indicated, is identical to the gate circuit 26 previously described in connection with the embodiment of the invention shown in FIG. 4. The gate circuit 26' accordingly includes saturable cores 120b–120b' having windings 120a and 120a' with one pair of commonly connected ends, the other ends thereof extending through oppositely arranged rectifiers 122 and 124 to a common conductor 126. The current flow in the windings 120a and 120a' during successive half cycles of the output of the square wave oscillator inverter circuit 22a produce magnetomotive forces in the cores 120b and 120b' which oppose the magnetomotive forces produced by the biasing current flowing in control windings 120e–120e' and 120d–120d'. When the biasing magnetomotive forces are overcome, synchronizing signals will be coupled through the windings 120a and 120a' to trigger the multivibrator circuit 22a'. The commonly connected ends of the windings 120a and 120a' are coupled by a conductor 132 to the left hand end of the primary winding 90a' of the transformer 91'. The primary winding 90a' has a center tap point and a resistor 295 is connected between the center tap point and the left hand end of the primary winding 90a'. A conductor 297 extends from the center tap point of the primary winding 90a' to the bottom end of a secondary winding 126 of the transformer 49a. The upper end of the winding 126 is coupled through a resistor 300 and a capacitor 302 to a conductor 304 extending to the right hand end of the winding 90a of transformer 91'. The conductor 306 also connects the upper end of the output winding 126 to the bottom end of a winding 301 of the transformer 49a', the upper end of which is connected to the aforementioned conductor 126 extending to the upper end of the gate circuit 26'. Upon saturation of the core device making up the gate circuit 26', a synchronizing signal will thereby be coupled to the primary winding 90a' which induces synchronizing pulses in the secondary windings 92a' and 92b' to fire the gated diodes 98a' and 98b' in a manner similar to that previously described in connection with the synchronizing circuit of the square wave oscillator and inverter circuit 22a.

The voltage and current sensor circuits 32 and 34 in the circuit of FIG. 6 are identical to that shown and described in connection with the circuit of FIG. 4 and the connections of these sensor circuits to the control windings 120d–120d' and 120e–120e' in these figures are also identical, so that a further detailed description thereof will not now be given. Suffice it to say, when a current overload exists at the output of the converter circuit, or a voltage transient exists on the power input conductors 40 and 73, the current which flows in the control windings 120e–120e' will vary the phase of operation of the output of the square wave oscillator and inverter circuit 22a' to reduce the magnitude of the output voltage which would otherwise be present. For extremely high current overloads, when the saturable cores 120b and 120b' will be effectively unsettable, a fixed 180° delay circuit 36' becomes operative to couple synchronizing pulses of proper phase to the primary winding 90a' which will operate the circuit 22a' so as to produce a signal output which is 180° out of phase with the output of circuit 22a. The resistor 300 and capacitor 302 constitute this fixed delay circuit which is operative to couple the signal of proper phase to effect a 180° phase displacement of the output of the square wave oscillator and inverter circuit 22a' relative to the output of the square wave oscillator and inverter circuit 22a.

It should be understood that numerous modifications may be made in the various forms of the invention described above without deviating from the broader aspects of the present invention.

What I claim as new and desire to protect by Letters Patent of the United States is:

1. A regulator circuit comprising: a first alternating current signal generator circuit providing a first signal of a given frequency each cycle of which comprises successive half cycle signals of the same amplitude and opposite polarity, a variable phase alternating current signal generator circuit for providing a signal of substantially identical waveform, amplitude and frequency as said first signal but variable in phase with respect thereto, signal adding means for adding said signals together, control means responsive to said first signal generator circuit for initiating each half cycle of operation of said variable phase signal generator circuit, said control means including gate means which couples the half cycle synchronizing signals from said first signal generator circuit to the variable phase signal generator circuit when the gate means open, gate control means responsive to the amplitude of the resultant signal provided by said signal adding means for opening said gate means during each half cycle of operation of the first signal generator circuit to maintain a fixed amplitude for the resultant signal, and overload control means selectively responsive only to loads above a given level by feeding a synchronizing signal to said variable phase signal generator circuit which provides a signal 180° out of phase with the signal generated by said first signal generator circuit substantially to reduce to zero the resultant output signal of the circuit.

2. A regulator circuit comprising: a first alternating current signal generator circuit providing a first signal of a given frequency each cycle of which comprises successive half cycle signals of the same amplitude and opposite polarity, a variable phase alternating current signal generator circuit for providing a signal of substantially identical waveform, amplitude and frequency as said first signal but variable in phase with respect thereto, signal adding means for adding said signals together, control means responsive to said first signal generator circuit for initiating each half cycle of operation of said variable phase signal generator circuit, said control means including gate means which couples half cycle synchronizing signals from said first signal generator circuit to the variable phase signal generator circuit when the gate means opens and gate control means responsive to the amplitude of the signal resulting from said signal adding means for opening said gate means during each half cycle of operation of the first signal generator circuit to maintain a fixed amplitude for said resultant signal, said control means comprising: a first and a second control winding of a pair of saturable core devices which windings provide a relatively low impedance when the associated core devices are saturated and a relatively high impedance when the associated core devices are unsaturated, a pair of oppositely connected rectifier means respectively in series with said first and second control windings for limiting current flow during alternate half cycles of operation of said first signal generator circuit, the current flowing in said control windings when the associated rectifiers are operated in their high conductive directions producing magnetomotive forces in a given direction in their associated core devices, and said gate control means including third and fourth control windings respectively on said saturable core devices, rectifier means and circuit connections feeding the resultant signal from said signal adding means to said third and fourth control windings through said rectifier means for providing a reset current flow through said third and fourth control windings which provide magnetomotive forces which oppose the magnetomotive forces generated by said first and second control windings, to delay the saturation of said saturable core devices and the coupling of synchronizing signals to said variable phase generator in accordance with the regulation requirements of the circuit, and to effect resetting of said core devices.

3. A circuit for providing a frequency and amplitude regulated sinusoidal signal, said circuit comprising: a resonant circuit stabilized multivibrator circuit for providing a first square wave signal of a given frequency each cycle of which comprises successive half cycle signals of the same amplitude and duration but of opposite polarity, a variable phase signal generator for providing a second square wave signal of substantially identical waveform and amplitude as said first-mentioned square wave signal but variable in phase with respect thereto, synchronizing means for operating said variable phase signal generator at the identical frequency as the output of said first signal generator but variable in phase with respect thereto, signal adding means for adding said first and second square wave signals together to provide alternating pulses of a width dependent upon the phase differences between the signals, filtering means for passing substantially only the fundamental Fourier series component from the signal provided by said signal adding means, to provide a sinusoidal signal having an amplitude varying with the relative phase of said signals, said filtering means comprising resonant circuit elements similar to those used in said resonant circuit stabilized signal generator, and phase control means for varying the phase of the signal generated by said variable phase signal generator relative to the phase of the signal generated by said first signal generator circuit to stabilize the amplitude of the filtered output signal.

4. A circuit for providing a frequency and amplitude regulated sinusoidal signal, said circuit comprising: a resonant circuit stabilized multivibrator circuit for providing a first square wave signal of a given frequency each cycle of which comprises successive half cycle signals of the same amplitude and duration but of opposite polarity, a variable phase signal generator for providing a second square wave signal of substantially identical waveform and amplitude as said first-mentioned square wave signal but variable in phase with respect thereto, synchronizing means for operating said variable phase signal generator at the identical frequency as the output of said first signal generator but variable in phase with respect thereto, signal adding means for adding said first and second square wave signals together to provide alternating pulses of a width dependent upon the phase differences between the signals, filtering means for passing substantially only the fundamental Fourier series component from the signal provided by said signal adding means, to provide a sinusoidal signal having an amplitude varying with the relative phase of said signals, said filtering means comprising resonant circuit elements similar to those used in said resonant circuit stabilized signal generator for removing the third harmonic from said resultant signal, whereby variations in the resonant frequency of the resonant circuit stabilized multivibrator circuits and said filtering means vary together in similar degrees, and phase control means for varying the phase of the signal generated by said variable phase signal generator relative to the phase of the signal generated by said first signal generator circuit to stabilize the amplitude of the filtered output signal.

5. The regulator circuit of claim 2 wherein there is provided means selectively responsive only to regulator circuit output current above a safe level for delaying the saturation of said saturable core devices in proportion to the value of the current involved.

6. The regulator circuit of claim 5 wherein there is provided an overload control means responsive to the output of said first alternating current signal generator circuit for operating said variable phase alternating current signal generator circuit 180 degrees out of phase relative to the output of first alternating current signal generator circuit when said gate control means is ineffective to control the synchronization of said variable phase alternating current signal generator circuit.

(References on following page)

References Cited by the Examiner

UNITED STATES PATENTS

| | | | |
|---|---|---|---|
| 2,959,725 | 11/60 | Younkin | 321—18 |
| 2,959,726 | 11/60 | Jensen | 321—18 |
| 2,990,519 | 6/61 | Wagner | 331—113 |
| 2,991,410 | 7/61 | Seike. | |
| 3,002,142 | 9/61 | Jensen | 321—9 |
| 3,020,491 | 2/62 | Kurtz | 331—113 |
| 3,031,629 | 4/62 | Kadri | 331—113 X |

LLOYD McCOLLUM, *Primary Examiner.*

MILTON O. HIRSHFIELD, *Examiner.*